United States Patent [19]
Wells

[11] 3,717,906
[45] Feb. 27, 1973

[54] CABLE TIE
[75] Inventor: Peter M. Wells, Sycamore, Ill.
[73] Assignee: Ideal Industries, Inc., Sycamore, Ill.
[22] Filed: Sept. 29, 1970
[21] Appl. No.: 76,524

[52] U.S. Cl. ............................................. 24/16 PB
[51] Int. Cl. ...................... B65d 63/00, A44b 17/00
[58] Field of Search .......... 24/16 PB, 30.5 PB, 206 A; 292/307 A; 268/76 PB

[56] References Cited

UNITED STATES PATENTS

| | | | |
|---|---|---|---|
| 3,484,905 | 12/1969 | Eberhardt | 24/16 PB |
| 3,118,200 | 1/1964 | Bell | 24/16 PB |
| 3,486,201 | 12/1969 | Bourne | 24/16 PB |
| 3,147,523 | 9/1964 | Logan | 24/16 PB |
| 2,900,696 | 8/1959 | Bacon | 24/16 PB |
| 2,969,216 | 1/1961 | Hallsey | 24/16 PB |
| 2,977,145 | 3/1961 | Rifkin | 24/16 PB |
| 3,102,311 | 9/1963 | Martin | 24/30.5 PB |
| 3,467,427 | 9/1969 | Moberg | 24/16 PB |
| 3,568,262 | 1/1969 | Woldman | 24/16 PB |

FOREIGN PATENTS OR APPLICATIONS

| | | | |
|---|---|---|---|
| 50,025 | 12/1966 | Germany | 24/16 PB |
| 943,240 | 12/1963 | Great Britain | 24/16 PB |

Primary Examiner—Bernard A. Gelak
Attorney—Parker & Carter

[57] ABSTRACT

A cable tie including a flat ratchet toothed strap and a hollow frame having pawls to engage the ratchet teeth of the strap. The pawls extend from opposite walls of the frame at the entrance thereto and converge in the direction of the outlet. The pawls terminate short of the outlet of the frame in free end surfaces which are generally flat and which are back tapered. The ratchet teeth on the strap are also back tapered and are bordered by flanges. In one modification, the tip of the strap is bent slightly out of the plane of the strap. In another modification, a mounting boss is attached to the frame. In yet another modification, an indicia receiving plate is formed between the strap and the frame.

7 Claims, 9 Drawing Figures

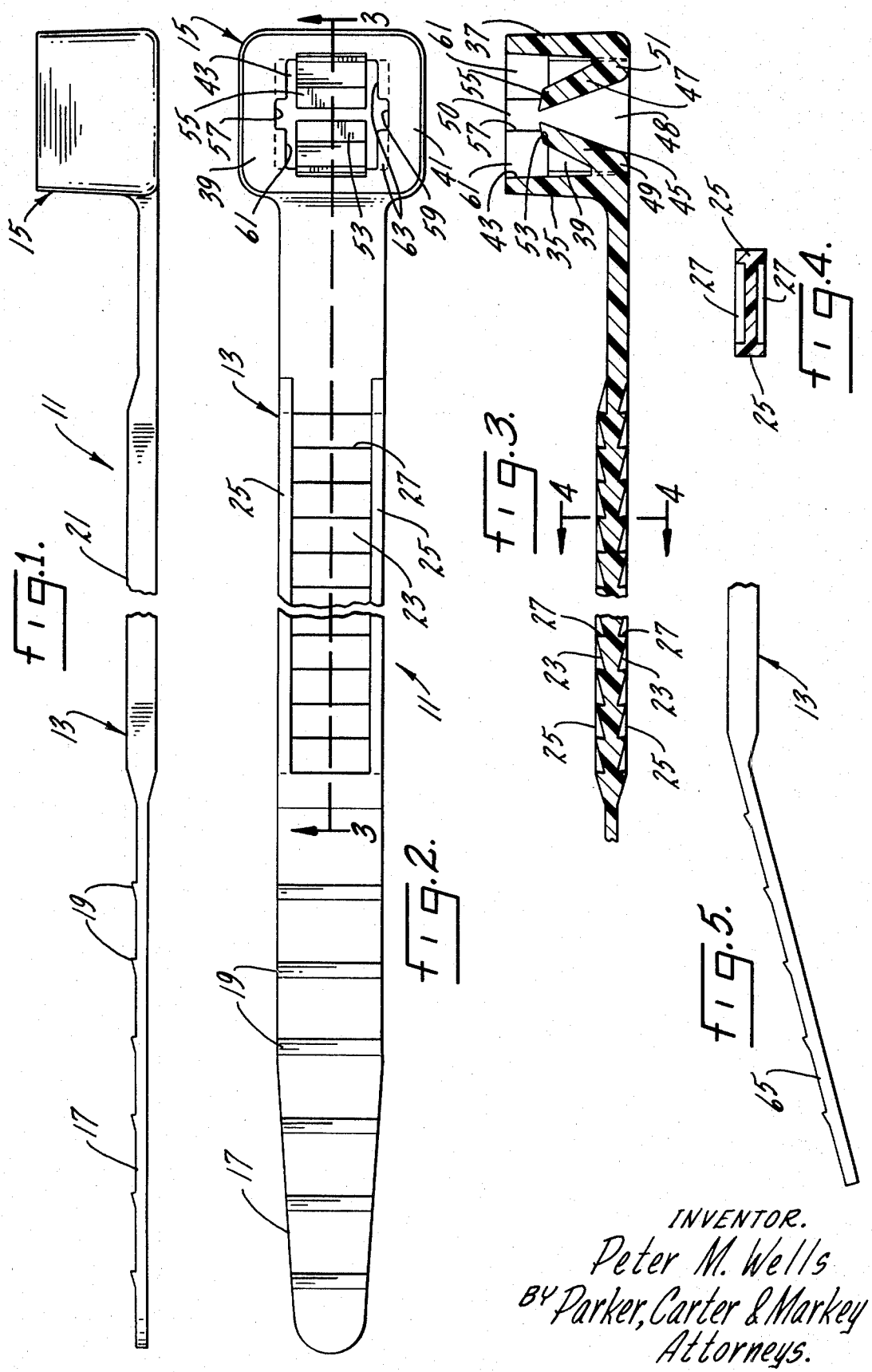

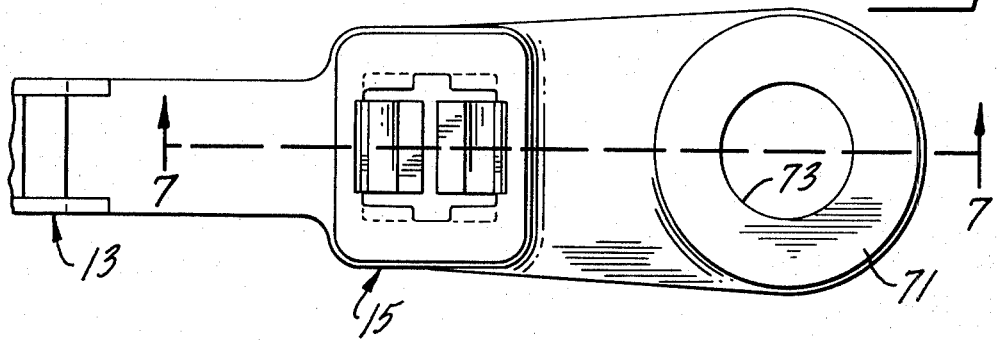
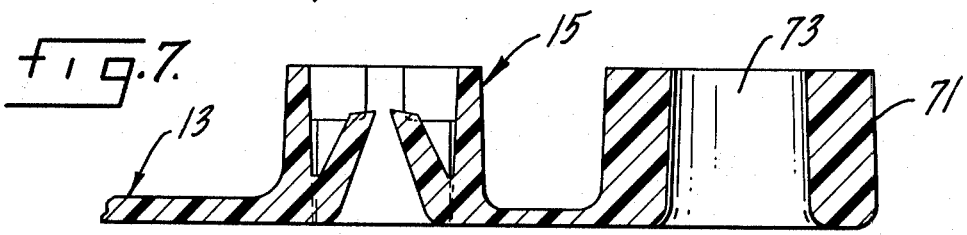
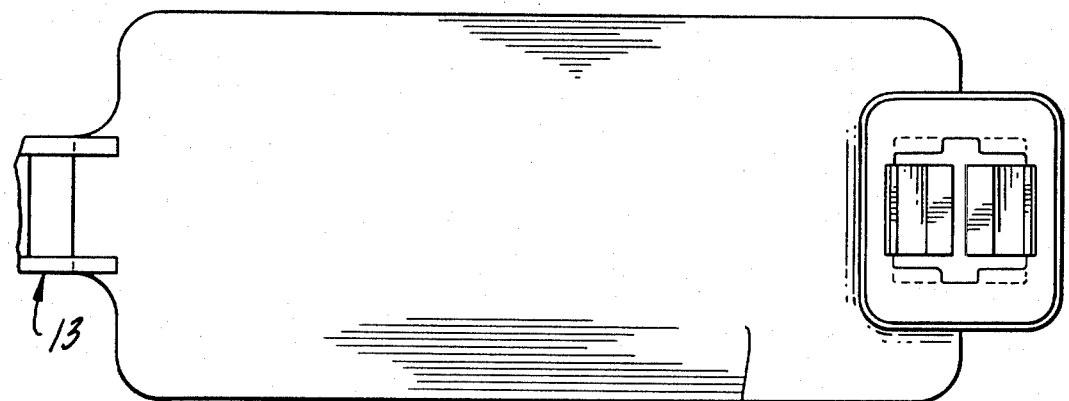
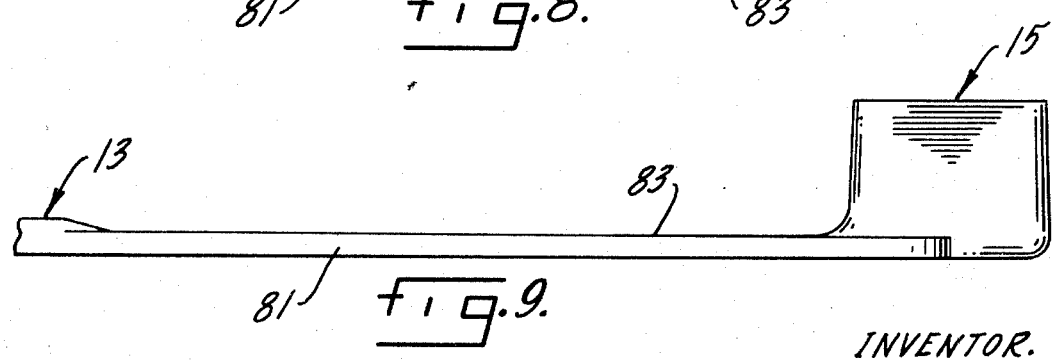
INVENTOR.
Peter M. Wells
BY Parker, Carter & Markey
Attorneys.

CABLE TIE

SUMMARY OF THE INVENTION

This invention is concerned with a cable tie of the type used for bundling wires and cables in circuit board and harness board assemblies.

An object of this invention is an integral, one piece molded cable tie having a ratchet toothed strap which may be easily inserted into a locking frame or head but which resists pull-out of the strap from the head.

Another object is a cable tie which may be used to connect wire bundles of various sizes.

Another object is a cable tie that is easy to pick-up and handle.

Another object is a cable tie having means for attachment to a supporting surface.

Another object is a cable tie having indicia receiving means formed integrally therewith.

Other objects may be found in the following specification, claims and drawings.

BRIEF DESCRIPTION OF THE DRAWINGS

The invention is illustrated more or less diagrammatically in the following drawings wherein:

FIG. 1 is a partial, side elevational view of a cable tie embodying the novel features of this invention;

FIG. 2 is a top plan view of the cable tie of FIG. 1;

FIG. 3 is a partial cross-sectional view taken along line 3—3 of FIG. 2;

FIG. 4 is a transverse cross-sectional view taken along line 4—4 of FIG. 3;

FIG. 5 is a partial elevational view of a modified form of cable strap;

FIG. 6 is a partial plan view of a modified form of cable tie;

FIG. 7 is a partial cross-sectional view taken along line 7—7 of FIG. 6;

FIG. 8 is a partial top plan view of another modified form of cable tie; and

FIG. 9 is a partial side elevational view of the modified cable tie of FIG. 8.

DESCRIPTION OF THE PREFERRED EMBODIMENTS

FIG. 1 shows an all plastic cable tie 11 formed integrally of a strap 13 and a head or frame 15. The tie is preferably molded of a material such as nylon, polypropylene, polyethylene or the like. The strap connects to the head, in this instance, at the lower end of the head as viewed in FIG. 1. The free end or tip portion 17 of the strap is formed with a number of small teeth 19 on one side thereof to provide the user with a non-slip surface to grasp. If desired, small teeth may be formed on both sides of the tip portion. The center or toothed portion 21 of the strap is formed with ratchet teeth 23 on the opposite sides thereof. The teeth 23 are bonded on their ends by flanges 25 which project at least as high as the teeth. The back surfaces 27 of the teeth are undercut or back tapered approximately 5°. It should be noted that the back surfaces of the teeth on one side of the strap are aligned with the back surfaces of the teeth on the opposite side of the strap.

The head or frame 15 is a hollow generally rectangular member having end walls 35 and 37 and side walls 39 and 41. The walls of the frame form a passage 43 through which the strap 13 may be passed. Located inside the passage 43 and formed integrally with the frame 15 are a pair of pawls 45 and 47. The pawls extend from the inside surfaces of the end walls 35 and 37 at the lower portion or entrance 48 to the passage 43. They project towards each other and towards the exit 50 from the passage or top of the frame 15 as viewed in FIG. 3. The integral connections between the end walls of the frame and the pawls form pivots or fulcrums as at 49 between pawl 45 and wall 35 and at 51 between pawl 47 and wall 37. As can be best seen in FIG. 2, the pawls are spaced from the side walls 39 and 41 of the frame. The pawls, which are of equal size, gradually diminish in cross-section towards their converging ends and terminate in flat surfaces 53 and 55. These flat surfaces are back tapered approximately 5°. The spacing between the pawls at their converging ends is less than the minimum thickness of the toothed portion 21 of the strap.

Notches 57 and 59 are formed in sets of projections 61 and 63 extending from the inside surfaces of the side walls 39 and 41. The notches receive and guide the flanges 25 of the strap 13.

A modified form of the cable tie of this invention is shown in FIG. 5. Therein, the tip portion 65 is bent out of the plane of the strap 13 and away from the direction of projection of the head 15.

Another modified form of cable tie is shown in FIGS. 6 and 7. In this modification, a boss 71 having a passage 73 of circular cross-section, is formed integrally with the head and connects to one end wall thereof through means of a thin, flexible web 75. The web 75 connects to the end wall of the head located opposite to the end wall to which the strap 13 connects.

Yet another modified form of cable tie is shown in FIGS. 8 and 9. In this modified construction, a flat plate 81 having an indicia receiving surface 83 is formed integrally between the head and the strap. The indicia receiving surface may be a matte finish to receive markings from pencils, pens and other markers.

The use, operation and function of this invention are as follows:

The cable tie of this invention may be used for many purposes. For example, it may be used for forming a number of discrete articles such as wires into a unitary bundle; for bundling a plurality of articles under tension; and for bundling and supporting articles or panels, harness boards and benches. The foregoing list of uses is by way of example and should not be considered in the way of limitation. Cable ties of this invention may be made in various sizes to secure bundles varying in diameter from 1/16th inch to 8 inches. A tie of one size may secure a bundle varying in diameter from 3/16ths inches to 8 inches.

In use, the strap portion 13 is wrapped around a bundle of wires and inserted through the passage 43 in the head or frame 15. The flanges 25 on opposite sides of the strap are received in the guides 57 and 59 so that the strap, and particularly the ratchet teeth 23 thereof, are centered between the pawls 45 and 47. As the strap 13 is forced through the passage 43, the teeth 23 engage the pawls, which being of equal cross-sections, are deflected equally about their pivots or fulcrums 49 and 51 to permit passage of the strap. Since the clearance between the ends of the pawls is less than the minimum thickness of the toothed portion 21 of the strap, the pawls will be slightly deflected when the strap is inserted in the flange. Reverse movement of the strap through the passage is prevented by engagement of the pawl end surfaces 53 and 55 with the back surfaces 27 of the teeth. Due to the back taper on both the end surfaces of the pawls and on the back surfaces of the teeth it is practically impossible to pull the strap back through the frame. Usually, either the strap or the teeth will break before the strap can be pulled back through.

In addition to guiding the strap through the notches 57 and 59 in the frame 15, the flanges 25 also function to strengthen the strap. Further, the flanges protect the wires being wrapped from engagement with the teeth 23 of the strap.

In the modified form of cable tie shown in FIG. 5, the bent tip portion 65 enables a person to pick up cable ties from a table or other flat smooth surface with relative ease. The grasping of the cable tie is also facilitated by the small teeth 19 formed at the free end or tip 17 of the cable tie.

The modified form of cable tie shown in FIGS. 6 and 7 include a boss 71 having a passage 73 of circular cross-section provided for attachment of the cable tie to a wall or support. A fastener such as a nail or screw may be inserted through the circular passage 73 to support the cable tie. The flexible web 75 between the boss and the head permits the boss to be deflected as much as 90° relative to the head to facilitate location and attachment of the boss prior to insertion of the strap in the head.

In the modified form of cable tie shown in FIGS. 8 and 9, identifying indicia may be placed on the indicia receiving surface 83 which is formed between the strap section and the strap receiving frame or head.

I claim:

1. A cable tie including an elongated flat strap and a hollow generally rectangular frame attached to one end of said strap, said strap having ratchet teeth formed on opposite sides thereof with the ratchet teeth on one side aligned with the ratchet teeth on the other side, said frame having side and end walls defining a passage therethrough for the free end of said strap, a pair of pawls extending from the inside surfaces of the end walls of said frame adjacent the entrance to said passage and projecting toward each other and toward the outlet of said passage, said pawls being spaced from the side walls of said frame throughout their entire extent, being inclined to the end walls of the frame and terminating short of the end walls from which said pawls extend, said pawls terminating in free end surfaces which are generally flat and which extend generally at right angles to the path of the strap through said passage, said free end surfaces of said pawls being spaced apart a distance less than the thickness of the ratchet teeth portions of said strap.

2. The structure of claim 1 further characterized in that slots are formed in the side walls of said frame to receive and guide said straps.

3. The structure of claim 1 further characterized in that the free end surfaces of the pawls and of the teeth are back tapered.

4. The structure of claim 1 further characterized in that said pawls reduce in cross-section from their bases to their free ends.

5. The structure of claim 1 further characterized in that said free end of said strap is bent slightly out of the plane of the remainder of said strap in a direction away from the outlet of said frame.

6. The structure of claim 1 further characterized in that a mounting boss is connected to said head and extends from said head in a direction opposite of said strap.

7. The structure of claim 1 further characterized in that a plate having an indicia receiving surface is located between said strap and said frame.

* * * * *